US008711996B2

(12) United States Patent
Chang

(10) Patent No.: US 8,711,996 B2
(45) Date of Patent: Apr. 29, 2014

(54) METHODS AND APPARATUS FOR DETERMINING A PHASE ERROR IN SIGNALS

(75) Inventor: Kun-Yung Chang, Los Altos, CA (US)

(73) Assignee: Rambus Inc., Sunnyvale, CA (US)

(*) Notice: Subject to any disclaimer, the term of this patent is extended or adjusted under 35 U.S.C. 154(b) by 342 days.

(21) Appl. No.: 13/171,363

(22) Filed: Jun. 28, 2011

(65) Prior Publication Data

US 2012/0014427 A1 Jan. 19, 2012

Related U.S. Application Data

(60) Provisional application No. 61/365,264, filed on Jul. 16, 2010.

(51) Int. Cl.
*H04L 7/02* (2006.01)

(52) U.S. Cl.
USPC .......................................................... 375/371

(58) Field of Classification Search
USPC ................... 375/371, 373, 378, 327
See application file for complete search history.

(56) References Cited

U.S. PATENT DOCUMENTS

| 5,557,647 | A  | * | 9/1996 | Kushige et al. ................ 375/371 |
| 7,362,634 | B2 |   | 4/2008 | Kwak ............................ 365/201 |
| 2005/0046490 | A1 |   | 3/2005 | Jasa et al. ........................ 331/25 |
| 2007/0286320 | A1 |   | 12/2007 | Jiang ............................. 375/371 |
| 2008/0025437 | A1 | * | 1/2008 | Huynh ........................... 375/324 |
| 2008/0244298 | A1 |   | 10/2008 | Rashid et al. ................. 713/400 |

FOREIGN PATENT DOCUMENTS

| EP | 0378982 B1 | 6/1994 | ............. H03L 7/091 |
| WO | WO 2007-106766 | 9/2007 | |

OTHER PUBLICATIONS

PCT Search Report and the Written Opinion dated Dec. 21, 2011 re Int'l. Application No. PCT/US2011/042236. 8 Pages.

* cited by examiner

*Primary Examiner* — Kevin Kim
(74) *Attorney, Agent, or Firm* — Steven J. Cahill

(57) ABSTRACT

An integrated circuit includes samplers, a phase error determination circuit, and periodic signal generators. The samplers generate respective sampled signals by sampling respective input signals in response to respective periodic signals. The input signals have a common phase error. The phase error determination circuit receives the sampled signals from the samplers. The phase error determination circuit generates a representation of the common phase error of the input signals in response to sampled signals received in a set-up mode in which the samplers sample respective input signals having a common bit pattern. The periodic signal generators generate the periodic signals differing in phase from one another by defined phase differences in the set-up mode and subject the periodic signals to a common phase shift in a normal mode in response to the representation of the common phase error. The common phase shift matches the common phase error of the input signals.

20 Claims, 6 Drawing Sheets

METHODS AND APPARATUS FOR DETERMINING A PHASE ERROR IN SIGNALS

CROSS REFERENCE TO RELATED APPLICATION

This patent application claims the benefit of U.S. provisional patent application 61/365,264, filed Jul. 16, 2010, which is incorporated by reference herein in its entirety.

BACKGROUND

In some data transmission systems, data is transmitted from a first integrated circuit to a second integrated circuit through one or more external conductors. A transmitter circuit in the first integrated circuit transmits the data to a receiver circuit in the second integrated circuit in response to a transmitter clock signal. The receiver circuit samples the data in response to a receiver clock signal.

A clock signal in the second integrated circuit is used to generate the receiver clock signal. The clock signal may be transmitted from the second integrated circuit to the first integrated circuit to generate the transmitter clock signal. The transmitter clock signal is provided to the transmitter circuit in the first integrated circuit through a clock distribution network. Temperature and voltage variations in the first integrated circuit may cause the clock distribution network to generate drift in the transmitter clock signal. The drift in the transmitter clock signal causes the transmitter circuit to introduce timing offsets into the data signals. Timing offsets in the data signals received from the transmitter circuit relative to the receiver clock signal may cause the receiver circuit to sample the data signals at the wrong time, generating incorrect data values.

A phase-locked loop or a delay-locked loop can be used in the first integrated circuit to reduce the effect of drift in the transmitter clock signal. However, phase-locked loops (PLLs) and delay-locked loops (DLLs) require additional die area and may consume a significant amount of power. Also, PLLs and DLLs are slow to lock the phase and frequency of an output clock signal to the phase and frequency of a reference clock signal after waking up from a low power state.

DETAILED DESCRIPTION

Figure 1:
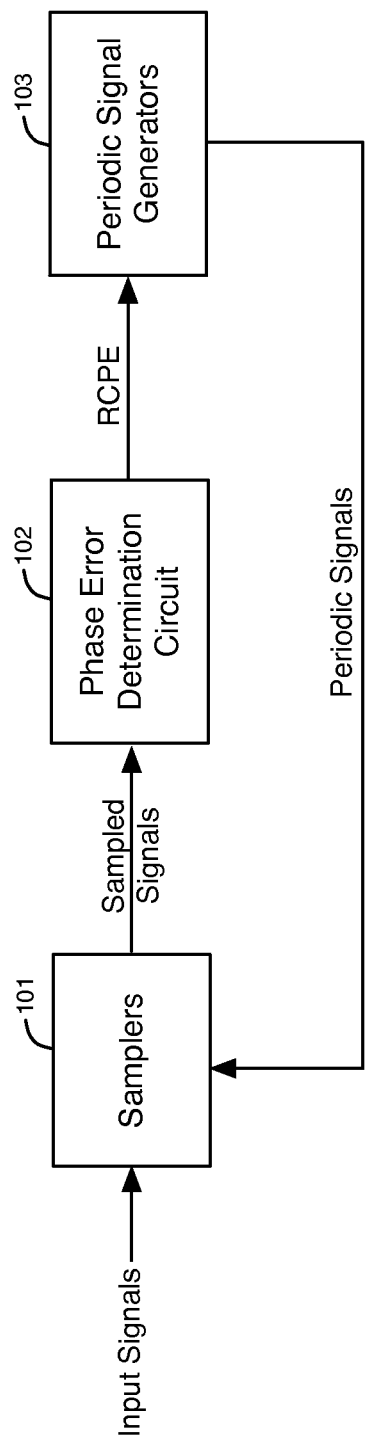
FIG. 1 illustrates an example of a circuit that corrects a common phase error in input signals by shifting phases of periodic signals used to sample the input signals.

FIG. 1 illustrates an example of a circuit that corrects a common phase error in input signals by shifting phases of periodic signals used to sample the input signals. The circuit of FIG. 1 includes samplers 101, a phase error determination circuit 102, and periodic signal generators 103. The samplers 101 generate sampled signals by sampling input signals having a common phase error in response to periodic signals.

The phase error determination circuit 102 is coupled to receive the sampled signals from the samplers 101. The phase error determination circuit 102 generates a representation of the common phase error (RCPE) of the input signals in response to sampled signals received in a set-up mode in which the samplers 101 sample respective input signals having a common bit pattern.

The periodic signal generators 103 are coupled to the samplers 101. The periodic signal generators 103 generate the periodic signals. The periodic signal generators 103 cause the periodic signals to differ in phase from one another by defined phase differences in the set-up mode. The periodic signal generators 103 subject the periodic signals to a common phase shift in a normal mode in response to the representation of the common phase error (RCPE). The common phase shift matches the common phase error of the input signals.

Figure 2A:
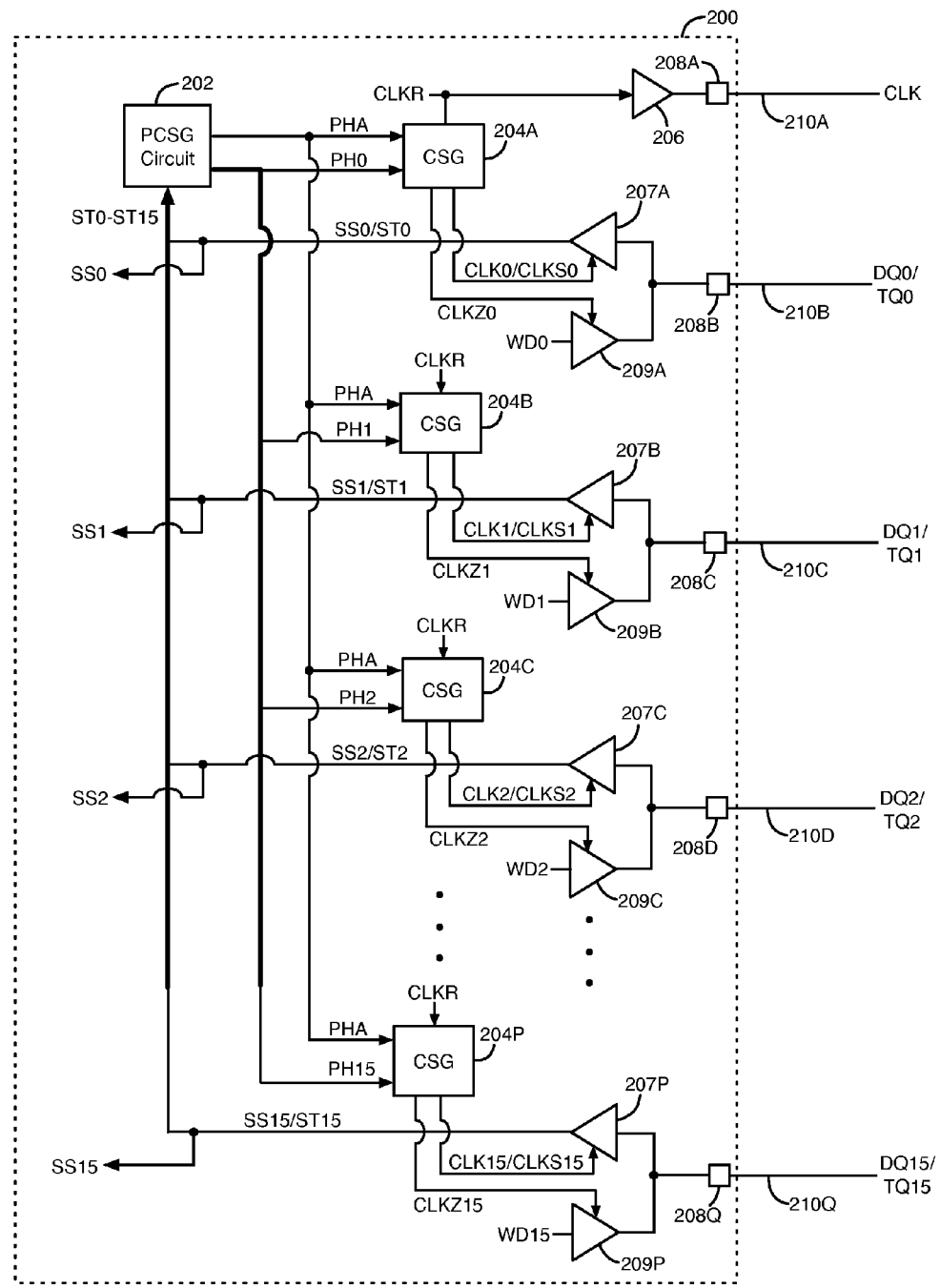
FIG. 2A illustrates an example of an integrated circuit having receiver circuits and a phase shift circuit that shifts phases of sampling clock signals based on signals received at the receiver circuits.

FIG. 2A illustrates another more detailed example of a circuit that corrects a common phase error in input signals by shifting phases of periodic signals used to sample the input signals. Integrated circuit 200, shown at least in part in FIG. 2A, includes phase control signal generation (PCSG) circuit 202, 16 clock signal generation (CSG) circuits 204A-204P, a buffer circuit 206, 16 receiver circuits 207A-207P, 16 transmitter circuits 209A-209P, and 17 external pins 208A-208Q. CSG circuits 204A-204P can be, for example, phase-locked loop circuits, phase mixer circuits, delay-locked loop circuits, or any combination thereof.

Pins 208A-208Q are connected to external conductors 210A-210Q, respectively. The inputs of receiver circuits 207A-207P are connected to pins 208B-208Q, respectively. During a normal mode, receiver circuits 207A-207P generate sampled data signals SS0-SS15, respectively, that are provided to other circuitry (not shown) in integrated circuit 200. During a set-up mode, receiver circuits 207A-207P generate sampled test signals ST0-ST15, respectively, that are provided to inputs of phase control signal generation circuit 202. The outputs of phase control signal generation circuit 202 that provide signals PH0-PH15 are connected to inputs of clock signal generation circuits 204A-204P, respectively. The output of phase control signal generation circuit 202 that provides signal PHA is connected to additional inputs of clock signal generation circuits 204A-204P. A clock signal CLKR is provided to the input of buffer circuit 206 and to clock inputs of clock signal generation circuits 204A-204P.

The outputs of transmitter circuits 209A-209P are coupled to pins 208B-208Q, respectively. The outputs of clock signal generation (CSG) circuits 204A-204P that provide clock signals CLK0-CLK15 or CLKS0-CLKS15 are connected to inputs of receiver circuits 207A-207P, respectively. The outputs of CSG circuits 204A-204P that provide clock signals CLKZ0-CLKZ15 are coupled to inputs of transmitter circuits 209A-209P, respectively. Phase control signal generation circuit 202, clock signal generation circuits 204A-204P, and receiver circuits 207A-207P, respectively, form closed loops.

Figure 2B:
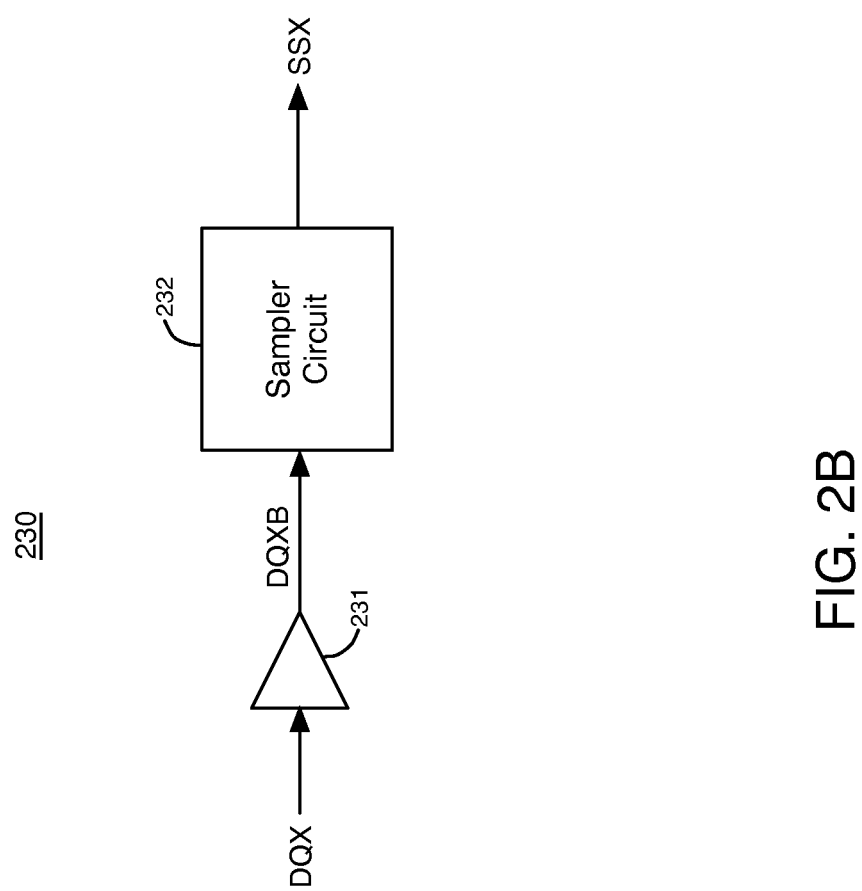
FIG. 2B illustrates an example of a receiver circuit.

Each of the receiver circuits 207A-207P includes a respective sampler circuit. FIG. 2B illustrates an example of a receiver circuit 230. In an embodiment, each of the receiver circuits 207A-207P in integrated circuit 200 includes a receiver circuit 230. Receiver circuit 230 includes a buffer circuit 231 and a sampler circuit 232. Buffer circuit 231 buffers input signal DQX to generated buffered signal DQXB. Sampler circuit 232 samples buffered signal DQXB to generate sampled signal SSX. Input signal DQX is signal DQ0-DQ15 or TQ0-TQ15 in a corresponding one of receiver circuits 207A-207P. Sampled signal SSX is signal SS0-SS15 or ST0-ST15 in a corresponding one of receiver circuits 207A-207P.

16 CSG circuits 204A-204P, 16 receiver circuits 207A-207P, and 16 transmitter circuits 209A-209P are shown in FIG. 2A merely as an example that is not intended to be limiting. The techniques shown and described herein can be applied to integrated circuits that have any suitable number of each of the receiver, transmitter, and CSG circuits (e.g., 4, 8, 12, 18, 24, 32, etc.).

Figure 3:
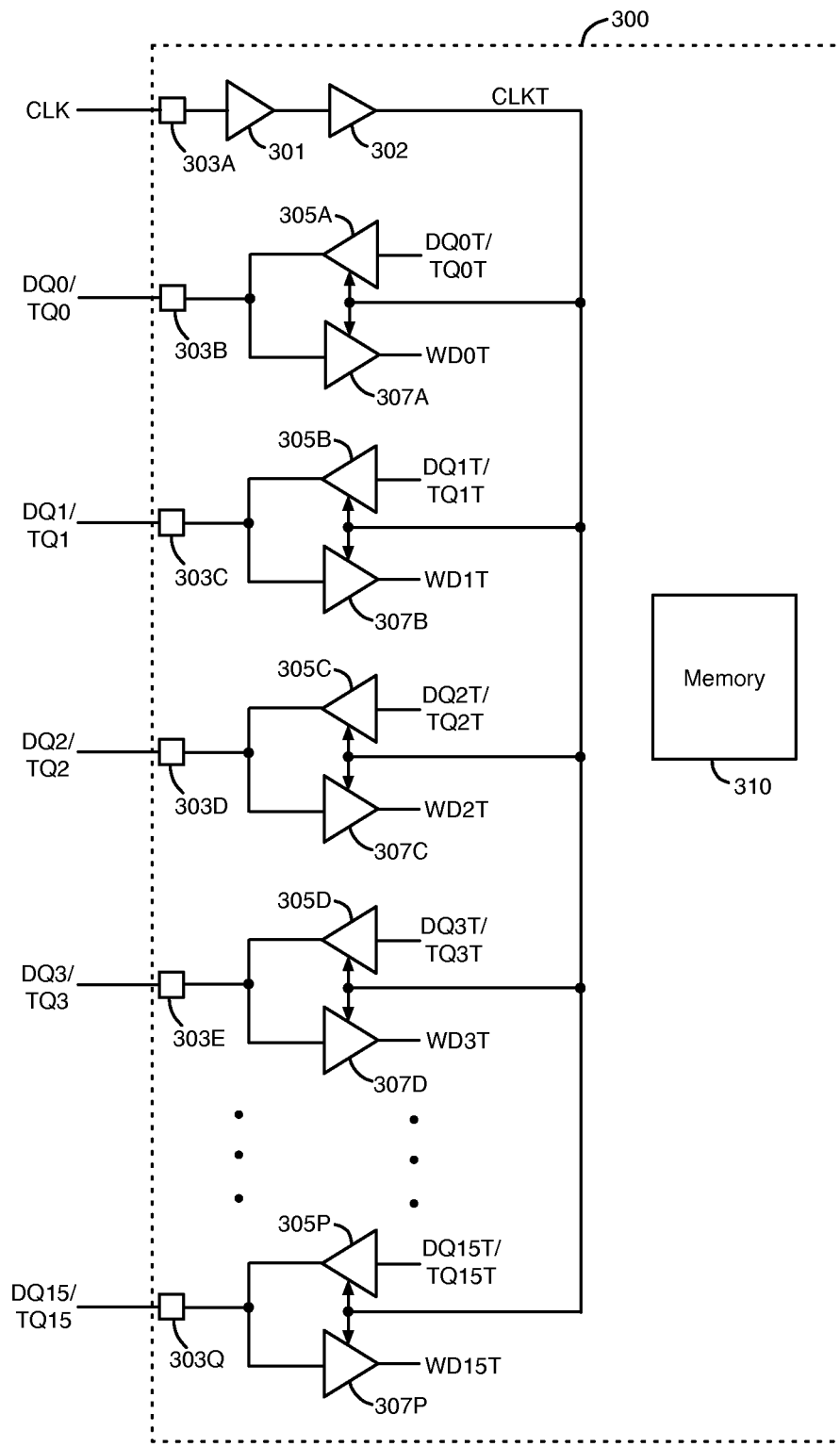
FIG. 3 illustrates an example of an integrated circuit having transmitter circuits that transmit signals in parallel to the integrated circuit shown in FIG. 2A.

FIG. 3 illustrates an example of an integrated circuit 300 having transmitter circuits that transmit data and test signals in parallel to the integrated circuit 200 shown in FIG. 2A. Integrated circuit 300, shown at least in part in FIG. 3, includes input buffer circuit 301, clock buffer circuit 302, 17 external pins 303A-303Q, 16 transmitter circuits 305A-305P, 16 receiver circuits 307A-307P, and memory circuit 310.

The clock input of input buffer circuit 301 is connected to pin 303A. The input of clock buffer circuit 302 is connected to the output of input buffer circuit 301. The output of clock buffer circuit 302 is connected to the clock inputs of transmitter circuits 305A-305P and to the clock inputs of receiver circuits 307A-307P. Data signals DQ0T-DQ15T or test signals TQ0T-TQ15T are provided to inputs of transmitter circuits 305A-305P, respectively. The outputs of transmitter circuits 305A-305P are connected to pins 303B-303Q, respectively. The inputs of receiver circuits 307A-307P are connected to pins 303B-303Q, respectively. Receiver circuits 307A-307P generate output signals WD0T-WD15T, respectively.

Referring additionally to FIG. 2A, output buffer circuit 206 buffers clock signal CLKR to generate buffered clock signal CLK. Clock signal CLK is transmitted outside integrated circuit 200 through pin 208A and external conductor 210A to integrated circuit 300 shown in FIG. 3.

Clock signal CLK is transmitted from integrated circuit 200 to the clock input of input buffer circuit 301 in integrated circuit 300 through pin 303A. Input buffer circuit 301 and clock buffer circuit 302 buffer clock signal CLK to generate clock signal CLKT. Clock signal CLKT is provided to the clock inputs of transmitter circuits 305A-305P and to the clock inputs of receiver circuits 307A-307P.

After integrated circuit 300 powers up, integrated circuit 300 enters a set-up mode. In the set-up mode, 16 test signals TQ0T-TQ15T are provided to inputs of transmitter circuits 305A-305P, respectively.

Integrated circuit 300 can transmit or receive signals via pins 303B-303Q. In the set-up mode, transmitter circuits 305A-305P output the digital values of the 16 test signals TQ0T-TQ15T as 16 test signals TQ0-TQ15 at pins 303B-303Q, respectively, in response to clock signal CLKT. Test signals TQ0-TQ15 are transmitted from integrated circuit 300 to integrated circuit 200 through external conductors 210B-210Q, respectively.

Temperature and voltage variations in integrated circuit 300 can cause buffer circuits 301-302 to generate drift in clock signal CLKT. Such drift in clock signal CLKT can cause transmitter circuits 305A-305P to subject test signals TQ0-TQ15, respectively, to a common timing offset. The timing offset is common in the sense that the drift in clock signal CLKT subjects test signals TQ0-TQ15 to the same timing offset in the set-up mode, regardless of timing differences among signals TQ0-TQ15.

When drift in clock signal CLKT subjects test signals TQ0-TQ15 to a common timing offset in set-up mode, test signals TQ0-TQ15 have a common phase error relative to the sampling clock signals CLK0-CLK15, respectively. During the normal mode, receiver circuits 207A-207P in integrated circuit 200 may sample input data signals DQ0-DQ15 incorrectly when input data signals DQ0-DQ15 have a common phase error relative to the sampling clock signals CLKS0-CLKS15, respectively.

Integrated circuit 200 enters a set-up mode after integrated circuit 200 powers up. During set-up mode, receiver circuits 207A-207P sample test signals TQ0-TQ15 generating sampled test signals ST0-ST15 to determine if test signals TQ0-TQ15 have a common phase error relative to sampling clock signals CLK0-CLK15, respectively. If the sampled test signals ST0-ST15 reveal that test signals TQ0-TQ15 have a common phase error, phase control signal generation circuit 202 and CSG circuits 204A-204P subject the sampling clock signals CLKS0-CLKS15 and CLKZ0-CLKZ15 to a common phase shift to match the common phase error in the test signals TQ0-TQ15, as will now be described in detail.

Integrated circuit 300 generates a test pattern in the set-up mode in which at least some, typically all, of test signals TQ0-TQ15 each alternate in state to provide a common input signal on respective ones of the external conductors 210. In the set-up mode of integrated circuit 200, the sampler circuits in receiver circuits 207A-207P oversample the common input signal to generate sampled test signals ST0-ST15. Phase control signal generation circuit 202 determines if there is a phase error in test signals TQ0-TQ15 relative to sampling clock signals CLK0-CLK15 based on the sampled test signals ST0-ST15, respectively. According to an embodiment implemented using integrated circuits 200 and 300 and that is described herein, the bit periods of bits embodied in signals DQ0-DQ15 are one-half as long as the periods of sampling clock signals CLK0-CLK15, and opposite digital values are transmitted in consecutive bit periods of test signals TQ0-TQ15.

To determine the common phase error in test signals TQ0-TQ15 relative to sampling clock signals CLK0-CLK15, phase control signal generation circuit 202 generates phase adjustment signals PH0-PH15. The phase adjustment signals PH0-PH15 are provided to CSG circuits 204A-204P, respectively. During the set-up mode, CSG circuits 204A-204P generate 16 sampling clock signals CLK0-CLK15 in response to an input reference clock signal CLKR. The phase adjustment signals PH0-PH15 cause the CSG circuits 204A-204P to shift the phases of sampling clock signals CLK0-CLK15, respectively, by 90° so that the rising and falling edges of sampling clock signals CLK0-CLK15 occur nominally at the transitions of test signals TQ0-TQ15.

Phase adjustment signals PH0-PH15 also cause CSG circuits 204A-204P to provide additional phase shifts to sampling clock signals CLK0-CLK15, respectively, that cause the sampling clock signals CLK0-CLK15 to be offset in phase relative to each other during the set-up mode. Thus, the relative phase offsets that CSG circuits 204A-204P provide to sampling clock signals CLK0-CLK15 during the set-up mode are based on the phase control signals PH0-PH15 generated by phase control signal generation circuit 202. Sampling clock signals CLK0-CLK15 are provided to clock inputs of receiver circuits 207A-207P, respectively.

As an example provided for the purpose of illustration, in the embodiment of FIG. 2A, phase adjustment signals PH0-PH15 cause CSG circuits 204A-204P to shift the phases of sampling clock signals CLK0-CLK15 by phase offsets of 90°+8S, 90°+7S, 90°+6S, 90°+5S, 90°+4S, 90°+3S, 90°+2S, 90°+S, 90°, 90°−S, 90°−2S, 90°−3S, 90°−4S, 90°−5S, 90°−6S, and 90°−7S, respectively. In this example, the incremental phase shifts that are added to the sampling clock signals CLK0-CLK15 are multiples of an incremental phase shift S so that the sampling clock signals CLK0-CLK15 are equally spaced apart by phase shift increments of S. In this example, clock signals CLK0-CLK7 are phase shifted by more than 90°, clock signal CLK8 is phase shifted by 90°, and clock signals CLK9-CLK15 are phase shifted by less than 90°. In a specific example that is not intended to be limiting, the phase difference between sampling clock signals CLK0 and CLK15 is 45°, and the incremental phase shift S is 2.8°.

In the set-up mode, the incremental phase shift S between the sampling clock signals CLK0-CLK15 can be set such that sampling clock signals CLK0-CLK15 have a phase range that is large enough to encompass an expected range of the drift in clock signal CLKT in integrated circuit 300. Phase control signal generation circuit 202 and CSG circuits 204A-204P can adjust the incremental phase shift S between the sampling clock signals CLK0-CLK15 based on an expected range of drift in CLKT in integrated circuit 300.

To determine the common phase error, integrated circuit 300 transmits test signals TQ0-TQ15 to integrated circuit 200 via external conductors 210B-210Q, respectively. Test signals TQ0-TQ15 may, for example, be part of a preamble of bits that is sent from integrated circuit 300 to integrated circuit 200 after these integrated circuits power up.

The test signals TQ0-TQ15 provided to integrated circuit 200 contain a sequence of test bits. Test signals TQ0-TQ15 have nominally-identical bit patterns, for example, in their preambles. The bit pattern 1010 is an exemplary bit pattern that can constitute each of the test signals TQ0-TQ15 to test for a phase error common to signals TQ0-TQ15 relative to sampling clock signals CLK0-CLK15. Alternatively, the test signals TQ0-TQ15 can have other bit patterns having more bits, fewer bits, or the same number of bits (i.e., 4 bits).

In the set-up mode, the test signals TQ0-TQ15 are transmitted in parallel from integrated circuit 300 to inputs of receiver circuits 207A-207P in integrated circuit 200 through external conductors 210B-210Q and pins 208B-208Q, respectively. The test signals TQ0-TQ15 are transmitted to integrated circuit 200 through single-ended or differential signaling using one or two conductors, respectively.

After sampling clock signals CLK0-CLK15 have been phase shifted during the set-up mode as described above, the sampler circuits in receiver circuits 207A-207P sample the 16 test signals TQ0-TQ15 in response to 16 sampling clock signals CLK0-CLK15 to generate 16 sampled test signals ST0-ST15, respectively. In the embodiment of FIG. 2B, a buffer circuit 231 in each of the receiver circuits 207A-207P buffers an input signal DQX to generate a buffered signal DQXB. Signal DQX represents any one of test signals TQ0-TQ15 in the set-up mode or any one of data signals DQ0-DQ15 in the normal mode. Sampler circuit 232 samples the buffered signal DQXB to generate a sampled signal SSX. Sampled signal SSX represents any one of the sampled test signals ST0-ST15 or any one of the sampled data signals SS0-SS15.

The sampled test signals ST0-ST15 generated based on test signals TQ0-TQ15, respectively, during the set-up mode are provided to respective inputs of phase control signal generation (PCSG) circuit 202. Phase control signal generation circuit 202 evaluates the digital values of the sampled test signals ST0-ST15 to determine when the transitions occur in the test signals TQ0-TQ15 relative to the rising and falling edges of sampling clock signals CLK0-CLK15, respectively.

Those of the receiver circuits 207A-207P that receive respective sampling clock signals CLK0-CLK15 having edges occurring before transitions in the respective test signals TQ0-TQ15 generate their respective sampled test signals ST0-ST15 in a first logic state. The first logic state indicates that the transitions of the respective sampling clock signals are early compared with the transitions of the test signals TQ0-TQ15. Those (typically the remainder) of the receiver circuits 207A-207P that receive respective sampling clock signals CLK0-CLK15 having edges occurring after transitions in the respective test signals TQ0-TQ15 generate their respective sampled test signals ST0-ST15 in a second logic state. The second logic state indicates that the transitions of the respective sampling clock signals are late compared with the transitions of the test signals TQ0-TQ15. If sampling clock signals CLK0-CLK15 do not contain a common phase error, the transitions in the test signals TQ0-TQ15 occur concurrently with the edges of sampling clock signal CLK8, sampled test signals ST9-ST15 are generated in the first logic state that indicates an early phase, and sampled test signals ST0-ST7 are generated in the second logic state that indicates a late phase.

Phase control signal generation circuit 202 receives the sampled test signals ST0-ST15 indicating early and late phases. Phase control signal generation circuit 202 determines the drift in test signals TQ0-TQ15 based on the two consecutive sampled test signals ST0-ST15 that indicate a transition from the early phase to the late phase. For example, if test signals TQ0-TQ15 are not affected by drift, receiver circuit 207H generates a sampled test signal ST7 indicating an early phase, and receiver circuit 207I generates a sampled test signal ST8 indicating a late phase. In this example, sampled test signals ST7-ST8 are the two consecutive sampled test signals indicating a transition from the early phase to the late phase. According to another example, if drift causes 4 incremental phase shifts (4S) in sampled test signals ST0-ST15, receiver circuit 207D generates a sampled test signal ST3 indicating an early phase, and receiver circuit 207E generates a sampled test signal ST4 indicating a late phase. In this second example, sampled test signals ST3-ST4 are the two consecutive samples test signals indicating a transition from the early phase to the late phase.

Phase control signal generation circuit 202 generates phase control signal PHA based on the digital values of the sampled test signal ST0-ST15 that are generated based on test signals TQ0-TQ15. Phase control signal generation circuit 202 generates the phase control signal PHA based on the digital values of the two consecutive sampled test signals among the 15 sampled test signals ST0-ST15 indicating the transition in the sampling clock signals CLK0-CLK15 from the early phase to the late phase.

In an embodiment, receiver circuits 207A-207P make one measurement of the test signals TQ0-TQ15, respectively, to generate the sampled test signals ST0-ST15, respectively. In another embodiment, multiple sets of test signals TQ0-TQ15 are transmitted from integrated circuit 300 to integrated circuit 200 in set-up mode during separate time intervals. In this embodiment, receiver circuits 207A-207P generate sampled test signals ST0-ST15 based on a majority vote or an average of the sampled values of the sets of test signals TQ0-TQ15.

According to various embodiments, the circuitry shown in FIGS. 2 and 3 may be implemented using custom circuitry, microcontroller circuits, processor circuits, programmable logic circuitry, or any combination of these circuits.

In an example, phase control signal generation circuit 202 has first registers that store the sampled test signals ST0-ST15, second registers that store the phase control signals PH0-PH15, and a third register that stores phase control signal PHA. Phase control signal generation circuit 202 also includes processing circuitry such as a processor circuit, a microcontroller circuit, or programmable logic circuitry that generates phase control signal PHA based on the values of the sampled test signals ST0-ST15 stored in the first registers. In some embodiments, phase control signal generation circuit 202 provides multi-bit phase control signal PHA to each of the CSG circuits 204A-204P.

In the normal mode, CSG circuits 204A-204P generate a second set of sampling clock signals CLKS0-CLKS15, respectively, and a third set of sampling clock signals CLKZ0-CLKZ15, respectively, in response to clock signal CLKR and phase control signal PHA. Phase control signal generation circuit 202 provides the phase control signal PHA to the inputs of the CSG circuits 204A-204P in the normal mode. Phase control signal PHA causes CSG circuits 204A-204P to subject the sampling clock signals CLKS0-CLKS15 and CLKZ0-CLKZ15 to a common phase shift. This common phase shift matches the phase error common to test signals TQ0-TQ15 relative to sampling clock signals CLK0-CLK15. The common phase shift to which the sampling clock signals CLKS0-CLKS15 and CLKZ0-CLKZ15 are subject equals the phase of the earliest sampling clock signal that indicates a late phase, minus 90°.

In an example in which phase control signal generation circuit 202 determines that sampled test signals ST0-ST3 have second logic states and sampled test signals ST4-ST15 have first logic states, transitions in the test signals TQ0-TQ15 occur between the edges of sampling clock signals CLK3 and CLK4. In this example, sampling clock signals CLK4-CLK15 have early phases relative to the transitions in the test signals TQ0-TQ15, and sampling clock signals CLK0-CLK3 have late phases relative to the transitions in the test signals TQ0-TQ15. Phase adjustment signal PHA causes the CSG circuits 204A-204P to subject sampling clock signals CLKS0-CLKS15 and CLKZ0-CLKZ15, respectively, to a common phase shift equal to 5 S (i.e., the incremental phase shift of sampling clock signal CLK3) to correct the common phase error between test signals TQ0-TQ15 and the sampling clock signals CLK0-CLK15.

In another example in which phase control signal generation circuit 202 determines that sampled test signals ST0-ST11 have second logic states and sampled test signals ST12-ST15 have first logic states, transitions in the test signals TQ0-TQ15 occur between the edges of sampling clock signals CLK11 and CLK12. In this example, sampling clock signals CLK12-CLK15 have early phases relative to the transitions in the test signals TQ0-TQ15, and sampling clock signals CLK0-CLK11 have late phases relative to the transitions in the test signals TQ0-TQ15. Phase adjustment signal PHA causes the CSG circuits 204A-204P to subject the sampling clock signals CLKS0-CLKS15 and CLKZ0-CLKZ15, respectively, to a common phase shift equal to −3 S (i.e., the incremental phase shift of sampling clock signal CLK11) to correct the common phase error between test signals TQ0-TQ15 and the sampling clock signals CLK0-CLK15.

According to an embodiment, a new set of test signals TQ0-TQ15 is sent to integrated circuit 200 at regular intervals to allow the circuitry of FIG. 2A to correct any phase error common to signals DQ0-DQ15 that is caused by low frequency drift (e.g., less than 100 MHz) in clock signal CLKT.

In the embodiments shown in FIGS. 1-2A, 16 test signals TQ0-TQ15 are sampled using 16 receiver circuits 207A-207P and 16 sampling clock signals CLK0-CLK15. Other embodiments sample any suitable number of test signals using a corresponding number of receiver circuits and sampling clock signals.

After the set-up mode has completed, integrated circuits 200 and 300 enter the normal mode. In the normal mode, integrated circuit 200 transmits or receives data signals DQ0-DQ15 via pins 208B-208Q, respectively, and integrated circuit 300 transmits or receives data signals DQ0-DQ15 via pins 303B-303Q, respectively. In normal mode, clock signal generator circuits 204A-204P generate sampling clock signals CLKS0-CLKS15, respectively, and sampling clock signals CLKZ0-CLKZ15, respectively, without the 90 degree phase shift used in set-up mode. Instead, clock signal generator circuits 204A-204P subject their respective sampling clock signals CLKS0-CLKS15 and CLKZ0-CLKZ15 to the common phase shift determined in the set-up mode, as described herein.

When transmitter circuits 305A-305P in integrated circuit 300 are enabled in the normal mode, transmitter circuits 305A-305P output the digital values of the 16 data signals DQ0T-DQ15T as 16 data signals DQ0-DQ15 at pins 303B-303Q, respectively, in response to clock signal CLKT. In an embodiment, data signals DQ0T-DQ15T are read data signals that are read from memory circuit 310. Drift in clock signal CLKT causes transmitter circuits 305A-305P to subject data signals DQ0-DQ15, respectively, to a common timing offset. Drift in clock signal CLKT subjects data signals DQ0-DQ15 to the same timing offset, regardless of timing differences among signals DQ0-DQ15.

The data signals DQ0-DQ15 are transmitted from integrated circuit 300 to receiver circuits 207A-207P in integrated circuit 200 through the same pins 208B-208Q and external conductors 210B-210Q that are used to transmit the test signals TQ0-TQ15. The sampler circuits in receiver circuits 207A-207P sample the input data signals DQ0-DQ15 in response to the phase shifted sampling clock signals CLKS0-CLKS15 to generate sampled data signals SS0-SS15, respectively. The sampled data signals SS0-SS15 have the same digital values as data signals DQ0T-DQ15T, respectively. The sampled data signals SS0-SS15 can be stored in memory (not shown) or processed by processing circuitry (not shown) in integrated circuit 200.

Integrated circuits 200 and 300 may be any types of integrated circuits. Integrated circuit 200 can be, for example, a memory integrated circuit, a controller integrated circuit, a processor integrated circuit, an analog integrated circuit, a digital integrated circuit, a programmable integrated circuit, etc. Integrated circuit 300 can be, for example, a memory integrated circuit, a controller integrated circuit, a processor integrated circuit, an analog integrated circuit, a digital integrated circuit, a programmable integrated circuit, etc.

In an embodiment, integrated circuit 200 is a memory controller integrated circuit, and integrated circuit 300 is a memory integrated circuit. In this embodiment, integrated circuit 300 reads data stored in memory circuit 310 during a read operation and then transmits the read data to integrated circuit 200 as data signals DQ0-DQ15, as described above. After power up of integrated circuits 200 and 300, the functions of the set-up mode described above are performed before packets of read data are sent from integrated circuit 300 to integrated circuit 200.

When transmitter circuits 209A-209P are enabled in the normal mode, transmitter circuits 209A-209P transmit signals outside integrated circuit 200 through pins 208B-208Q in response to the phase shifted sampling clock signals CLKZ0-CLKZ15, respectively. In an example in which integrated circuit 200 is a memory controller integrated circuit, and integrated circuit 300 is a memory integrated circuit, transmitter circuits 209A-209P transmit write data signals DQ0-DQ15 to integrated circuit 300 via pins 208B-208Q, respectively. Transmitter circuits 209A-209P generate write data signals DQ0-DQ15 based on write data signals WD0-

WD15 in response to the phase shifted sampling clock signals CLKZ0-CLKZ15, respectively. Receiver circuits 307A-307P in integrated circuit 300 receive the write data signals DQ0-DQ15 from transmitter circuits 209A-209P via pins 303B-303Q, respectively. Receiver circuits 307A-307P sample the write data signals DQ0-DQ15 received from pins 303B-303Q in response to clock signal CLKT to generate sampled write data signals WD0T-WD15T, respectively. In an embodiment, receiver circuits 307A-307P each have a receiver circuit 230 as shown in FIG. 2B. The sampled write data signals WD0T-WD15T are stored in memory circuit 310.

The common phase shift to which the sampling clock signals CLKZ0-CLKZ15 are subject causes a timing offset in the write data signals DQ0-DQ15 output by transmitter circuits 209A-209P, respectively, that corrects the drift in clock signal CLKT. The timing offset in the write data signals DQ0-DQ15 causes receiver circuits 307A-307P to sample the correct digital values in the write data signals DQ0-DQ15, respectively, in response to clock signal CLKT. The techniques described herein can also be used to correct any phase error common to write data signals DQ0-DQ15 relative to sampling clock signals CLK0-CLK15 prior to transmitter circuits 209A-209P transmitting the write data signals DQ0-DQ15 outside integrated circuit 200. Corrected phases are generated in the sampling clock signals CLKZ0-CLKZ15 by evaluating the sampled test signals ST0-ST15 that are sampled in response to test signals TQ0-TQ15, as described above.

Any phase offset common to test signals TQ0-TQ15 can be matched in sampling clock signals CLKS0-CLKS15 and CLKZ0-CLKZ15 using the techniques described herein prior to receiver circuits 207A-207P receiving read data from integrated circuit 300 and/or prior to transmitter circuits 209A-209P transmitting write data to integrated circuit 300. A phase shift can be added to each of the sampling clock signals CLKS0-CLKS15 and CLKZ0-CLKZ15 to match a common phase offset in test signals TQ0-TQ15 as described herein prior to receiver circuits 207A-207P receiving read data and prior to transmitter circuits 209A-209P transmitting write data. The phase shifts added to sampling clock signals CLKS0-CLKS15 prior to the read operations can be the same or different than the phase shifts added to the sampling clock signals CLKZ0-CLKZ15 prior to the write operations, depending on the drift at the time the common phase offset is determined.

The corrected phases of the sampling clock signals CLKZ0-CLKZ15 affect the timing of the write data signals DQ0-DQ15 such that the edges of clock signal CLKT occur in the centers of the sampling windows of the write data signals DQ0-DQ15 when sampled by receiver circuits 307A-307P. An example of a system that adds a phase shift to a clock signal provided to both receiver and transmitter circuits based on a drift value is described in commonly-assigned U.S. patent application publication 20090032091, published Jan. 29, 2009, to Chang et al., which is incorporated by reference herein in its entirety.

Figure 4:
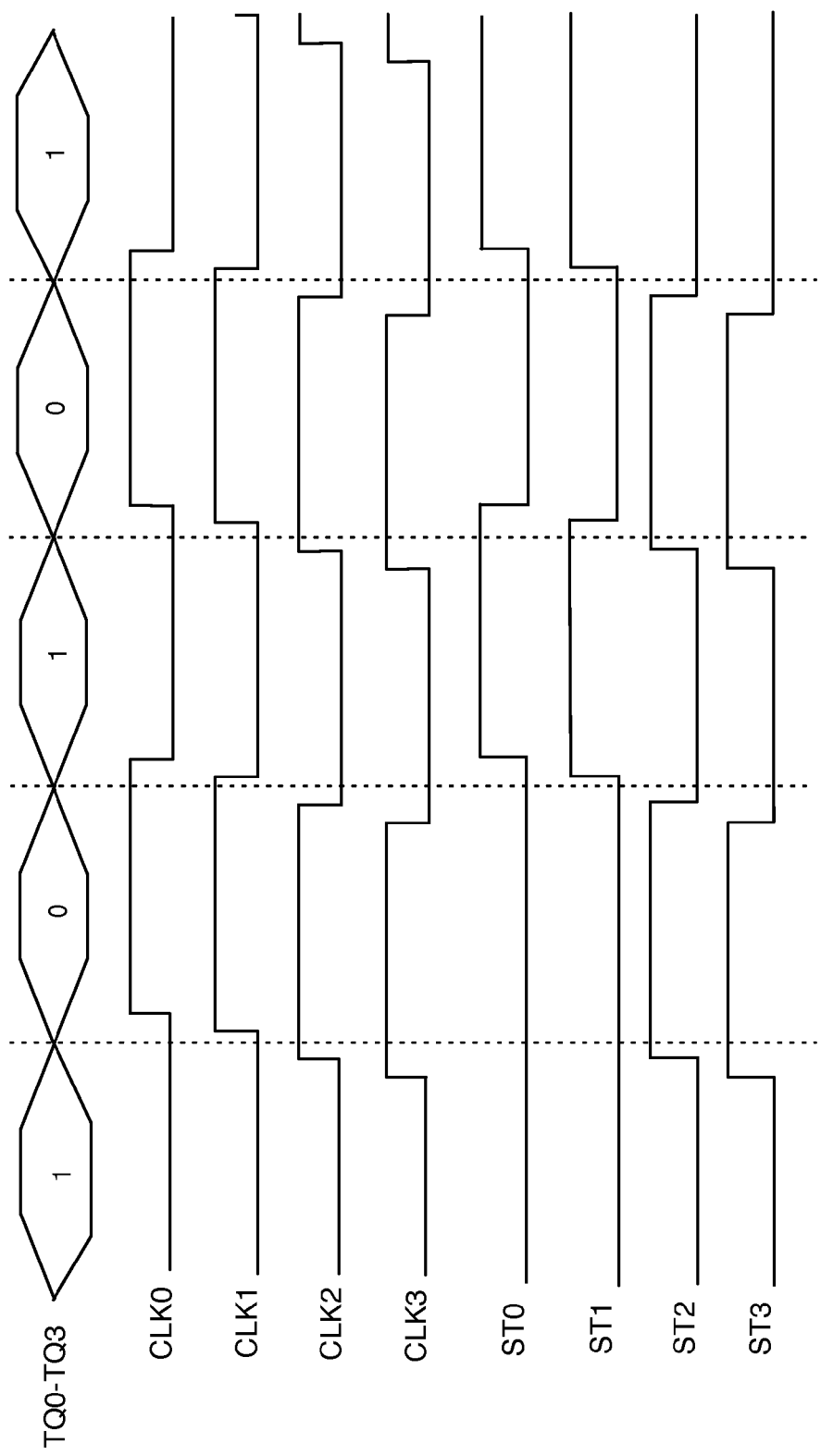
FIG. 4 is a timing diagram that illustrates examples of waveforms for 4 test signals, 4 sampling clock signals, and 4 sampled signals during the set-up mode of the circuitry of FIG. 2A.

FIG. 4 is a timing diagram that illustrates examples of waveforms for 4 test signals TQ0-TQ3, 4 sampling clock signals CLK0-CLK3, and 4 sampled signals ST0-ST3 during the set-up mode of the circuitry of FIG. 2A. In the embodiment described with respect to FIG. 4, 4 receiver circuits 207A-207D and 4 CSG circuits 204A-204D are used to correct the phase offset in 4 test signals TQ0-TQ3. Sampling clock signals CLK0-CLK3 are offset in phase relative to each other as shown in FIG. 4. The sampling clock signals CLK0-CLK3 are offset in phase from each other by incremental phase shifts S. FIG. 4 shows the waveforms for the sampling clock signals CLK0-CLK3 relative to the exemplary waveforms for test signals TQ0-TQ3 and relative to the respective sampled test signals ST0-ST3 generated by sampling test signals TQ0-TQ3.

In the example of FIG. 4, the transitions in TQ0-TQ3 occur between the edges of sampling clock signals CLK1 and CLK2 as shown by the dotted lines. Phase control signal generation circuit 202 determines the phase shift to which sampling clock signals CLKS0-CLKS3 will be subject based on the rising edges of sampled test signal ST1 occurring more than one-half a clock period after the corresponding rising edges of sampled test signal ST2.

If all of the sampled test signals ST0-ST3 indicate early phases or all of the sampled test signals ST0-ST3 indicate late phases, phase control signal generation circuit 202 and CSG circuits 204A-204D increase the phase range of the sampling clock signals CLK0-CLK3 in a subsequent test. Alternatively or in addition to these embodiments, once an initial phase shift has been carried out using the increased phase range, phase control signal generation circuit 202 and CSG circuits 204A-204D can decrease the phase range of sampling clock signals CLK0-CLK3 in a subsequent phase shift operation to increase the resolution of the phase shift.

Figure 5:
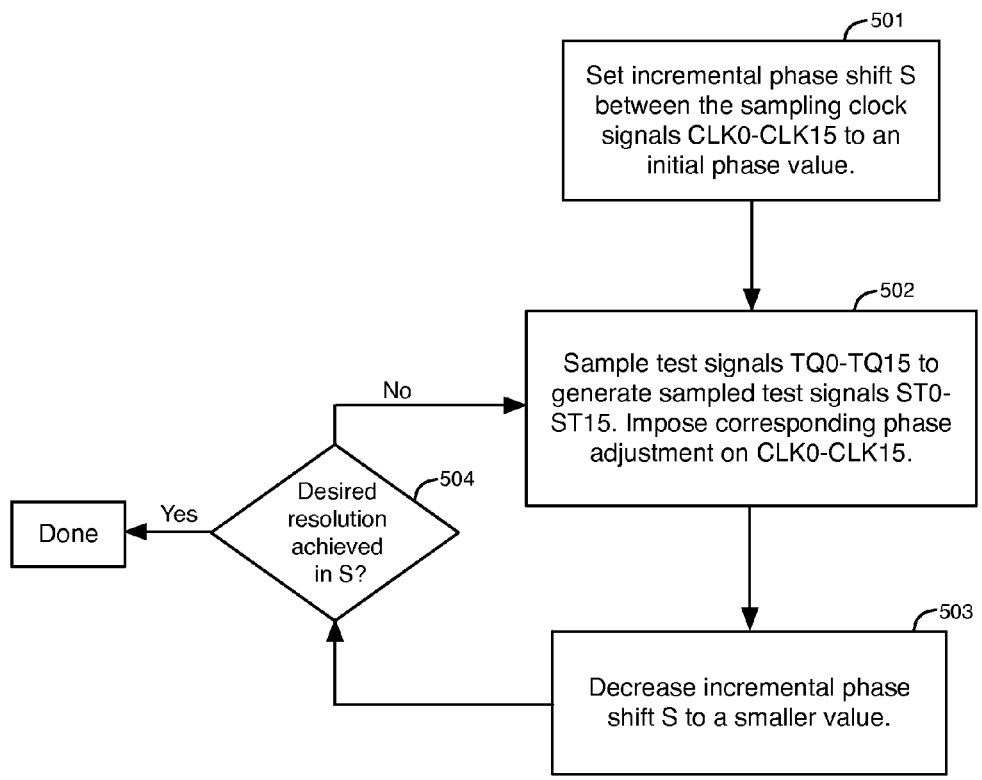
FIG. 5 is a flow chart illustrating a technique that can correct a phase error common to a set of sampling clock signals by testing a set of identical test signals.

FIG. 5 is a flow chart illustrating a technique that can correct a phase error common to a set of sampling clock signals by testing a set of identical test signals. In operation 501, phase control signal generation circuit 202 and clock signal generation (CSG) circuits 204A-204P set the incremental phase shift S between the sampling clock signals CLK0-CLK15 to an initial phase value. In operation 502, receiver circuits 207A-207P sample test signals TQ0-T15 to generate first sampled test signals ST0-ST15 in response to sampling clock signals CLK0-CLK15. In response to the first sampled test signals ST0-ST15, sampling clock signals CLK0-CLK15 are subject to a first phase shift, as described above with reference to FIG. 2A.

After the first phase shift has been performed, phase control signal generation circuit 202 and CSG circuits 204A-204P decrease the incremental phase shift S between the sampling clock signals CLK0-CLK15 to a smaller value at operation 503. Phase control signal generation circuit 202 then determines if a desired resolution has been achieved in the incremental phase shift S at step 504.

If a desired resolution has not been achieved in the incremental phase shift S, receiver circuits 207A-207P sample test signals TQ0-TQ15 to generate second sampled test signals ST0-ST15 in response to sampling clock signals CLK0-CLK15. In response to the second sampled test signals ST0-ST15, the circuitry of FIG. 2A subjects sampling clock signals CLK0-CLK15 to a corresponding second phase shift in operation 502. Subsequently, phase control signal generation circuit 202 and CSG circuits 204A-204P again decrease the incremental phase shift S between the sampling clock signals CLK0-CLK15 to a smaller value in operation 503.

If phase control signal generation circuit 202 determines that a desired resolution has been achieved using the incremental phase shift S in operation 504, no additional phase shifts are performed. If phase control signal generation circuit 202 determines that a desired resolution has not been achieved using the incremental phase shift S in operation 504, the circuitry of FIG. 2A performs additional phase shifts by repeating operations 502-503 until a desired resolution is achieved in the incremental phase shift S. The common phase shifts obtained as described above are combined to provide a respective overall phase shift in sampling clock signals CLKS0-CLKS15 and CLKZ0-CLKZ15 during normal mode.

The incremental phase shift S between the sampling clock signals CLK0-CLK15 represents the maximum error in the measurements of the transitions in the test signals TQ0-TQ15 that are performed by the circuitry of FIG. 2A. In an embodiment, a minimum value for the incremental phase shift S is slightly larger than the jitter in the test signals TQ0-TQ15.

The technique of FIG. 5 can, for example, be performed using a binary search algorithm. The binary search algorithm can be implemented in hardware or in software. Performing multiple phase shifts as shown in and described with reference to FIG. 5 may, for example, be used in an integrated circuit that has a small number of receiver circuits (e.g., 4) for sampling the test signals. The resolution of the phase shift performed by the small number of receiver circuits can be increased by performing multiple iterations of steps 502-504, as described above.

Drift caused by components in integrated circuit 200 may cause additional phase errors in the sampling clock signals CLK0-CLK15. Techniques for detecting and canceling phase errors between sampling clock signals that are caused by drift in an integrated circuit are described in commonly-assigned U.S. patent application publication 20080056415, to Chang et al., published Mar. 6, 2008, which is incorporated by reference herein in its entirely.

The foregoing description of the exemplary embodiments has been presented for the purposes of illustration and description. The foregoing description is not intended to be exhaustive or limiting to the examples disclosed herein. In some instances, certain features of the embodiments can be employed without a corresponding use of other features as set forth. Many modifications, substitutions, and variations are possible in light of the above teachings, without departing from the scope of the claims.

What is claimed is:

1. An integrated circuit, comprising:
   samplers to generate respective sampled signals by sampling respective input signals in response to respective periodic signals, the input signals subject to a common phase error;
   a phase error determination circuit coupled to receive the sampled signals from the samplers, and operable to generate a representation of the common phase error of the input signals in response to sampled signals received in a set-up mode in which the samplers sample respective input signals having a common bit pattern; and
   periodic signal generators coupled to the samplers, the periodic signal generators operable in the set-up mode to generate the periodic signals differing in phase from one another by defined phase differences and additionally operable in a normal mode to subject the periodic signals to a common phase shift in response to the representation of the common phase error, the common phase shift matching the common phase error of the input signals.

2. The integrated circuit of claim 1 further comprising:
   transmitters, each of the transmitters to transmit a respective output signal in response to a respective one of the periodic signals after the periodic signals have been subjected to the common phase shift in the normal mode.

3. The integrated circuit of claim 1 wherein the samplers sample data signals in response to the periodic signals to generate sampled data signals after the periodic signals have been subjected to the common phase shift in the normal mode.

4. The integrated circuit of claim 1 wherein the integrated circuit comprises three of the samplers.

5. The integrated circuit of claim 1 wherein the integrated circuit comprises four of the samplers.

6. The integrated circuit of claim 1 wherein the phase error determination circuit comprises:
   a finite state machine that receives the sampled signals from the samplers and that generates a phase control signal embodying the representation of the common phase error of the input signals in response to the sampled signals.

7. The integrated circuit of claim 1 wherein the periodic signal generators comprise phase mixer circuits.

8. The integrated circuit of claim 1 wherein the periodic signal generators comprise phase-locked loops.

9. The integrated circuit of claim 1 wherein the samplers generate additional respective sampled signals by sampling the respective input signals in response to the respective periodic signals in the set-up mode after the periodic signal generators have subjected the periodic signals to the common phase shift,
   wherein the phase error determination circuit is operable to generate an additional representation of the common phase error of the input signals in response to the additional sampled signals received in the set-up mode, and
   wherein the periodic signal generators subject the periodic signals to an additional common phase shift based on the additional representation of the common phase error of the input signals.

10. The integrated circuit of claim 1 wherein the integrated circuit is a memory controller integrated circuit.

11. The integrated circuit of claim 1 wherein the integrated circuit is a controller integrated circuit.

12. A method comprising:
   generating periodic signals differing in phase from one another by defined phase differences in a set-up mode;
   sampling input signals in the set-up mode in response to the periodic signals to generate sampled signals, the input signals having a common phase error and a common bit pattern in the set-up mode;
   generating a representation of the common phase error of the input signals in response to the sampled signals in the set-up mode; and
   subjecting the periodic signals to a common phase shift in response to the representation of the common phase error in a normal mode, the common phase shift matching the common phase error of the input signals.

13. The method of claim 12 further comprising:
   transmitting output signals in response to the periodic signals in the normal mode after the periodic signals have been subjected to the common phase shift.

14. The method of claim 12 further comprising:
   sampling data signals to generate sampled data signals in the normal mode after the periodic signals have been subjected to the common phase shift.

15. The method of claim 12 further comprising:
   shifting phases of the periodic signals to cause the periodic signals to differ in phase from one another by additional phase differences in the set-up mode;
   sampling the input signals in the set-up mode in response to the periodic signals to generate additional sampled signals after the periodic signals have been shifted by the common phase shift and by the additional phase differences;
   generating an additional representation of the common phase error of the input signals in response to the additional sampled signals; and
   subjecting the periodic signals to an additional common phase shift in response to the additional representation of the common phase error.

16. The method of claim 15 further comprising:
determining if a target resolution has been achieved in the additional phase differences between the periodic signals.

17. The method of claim 12 wherein sampling input signals in the set-up mode in response to the periodic signals to generate sampled signals further comprises sampling three of the input signals in the set-up mode in response to three of the periodic signals to generate three of the sampled signals.

18. The method of claim 17 wherein subjecting the periodic signals to a common phase shift in response to the representation of the common phase error in a normal mode further comprises subjecting three of the periodic signals to the common phase shift in response to the representation of the common phase error.

19. The method of claim 12 further comprising:
generating each of the periodic signals in response to a clock signal.

20. The method of claim 19 further comprising:
transmitting the input signals in response to a transmitter periodic signal that is generated in response to the clock signal.

* * * * *